US011793101B2

(12) United States Patent
Bogdan et al.

(10) Patent No.: US 11,793,101 B2
(45) Date of Patent: Oct. 24, 2023

(54) FLAGGING OPERATIONAL DIFFERENCES IN AGRICULTURAL IMPLEMENTS

(71) Applicant: Climate LLC, Saint Louis, MO (US)

(72) Inventors: Christina Bogdan, Queens, NY (US); Daniel Williams, Sacramento, CA (US)

(73) Assignee: CLIMATE LLC, Saint Louis, MO (US)

( * ) Notice: Subject to any disclaimer, the term of this patent is extended or adjusted under 35 U.S.C. 154(b) by 85 days.

(21) Appl. No.: 17/181,684

(22) Filed: Feb. 22, 2021

(65) Prior Publication Data

US 2021/0267117 A1 Sep. 2, 2021

Related U.S. Application Data

(60) Provisional application No. 62/980,065, filed on Feb. 21, 2020.

(51) Int. Cl.
*A01B 79/00* (2006.01)
*A01C 21/00* (2006.01)
*A01C 7/10* (2006.01)
*G06Q 50/02* (2012.01)

(52) U.S. Cl.
CPC .......... *A01B 79/005* (2013.01); *A01C 21/007* (2013.01); *A01C 7/102* (2013.01); *A01C 21/005* (2013.01); *G06Q 50/02* (2013.01)

(58) Field of Classification Search
CPC ... A01B 79/005; A01C 21/007; A01C 21/005; A01C 7/102; G06Q 50/02
USPC .......................................................... 702/5
See application file for complete search history.

(56) References Cited

U.S. PATENT DOCUMENTS

| 2003/0187577 | A1 | 10/2003 | McClure et al. |
| 2010/0185366 | A1 | 7/2010 | Heiniger et al. |
| 2011/0259618 | A1 | 10/2011 | Zielke |
| 2020/0201269 | A1* | 6/2020 | Johannesson ........... G06F 17/18 |

OTHER PUBLICATIONS

International Bureau, "Search Report" in application No. PCT/US21/19095, dated May 6, 2021, 11 pages.
Current Claims in application No. PCT/US21/19095, dated May 2021, 7 pages.

* cited by examiner

*Primary Examiner* — Michael P Nghiem
(74) *Attorney, Agent, or Firm* — Harness, Dickey & Pierce, P.L.C.

(57) ABSTRACT

Systems and methods for identifying operational abnormalities based on data received from an agricultural implement performing a task in an agricultural field are described herein. In an embodiment, a system receives time-series data captured from an agricultural implement performing an agronomic activity on an agricultural field, the time-series data including, for each of a plurality of timestamps, a location of the agricultural implement. The system identifies a plurality of passes in the time-series data and using the identified plurality of passes, identifies a plurality of location on the agricultural field in which the activity performed by the agricultural implement included a particular operational abnormality. The system generates a map of operational abnormalities for the agricultural field, the map of operational abnormalities including the plurality of locations on the agricultural field in which the activity performed by the agricultural implement included the particular operational abnormality.

22 Claims, 13 Drawing Sheets

Fig. 2
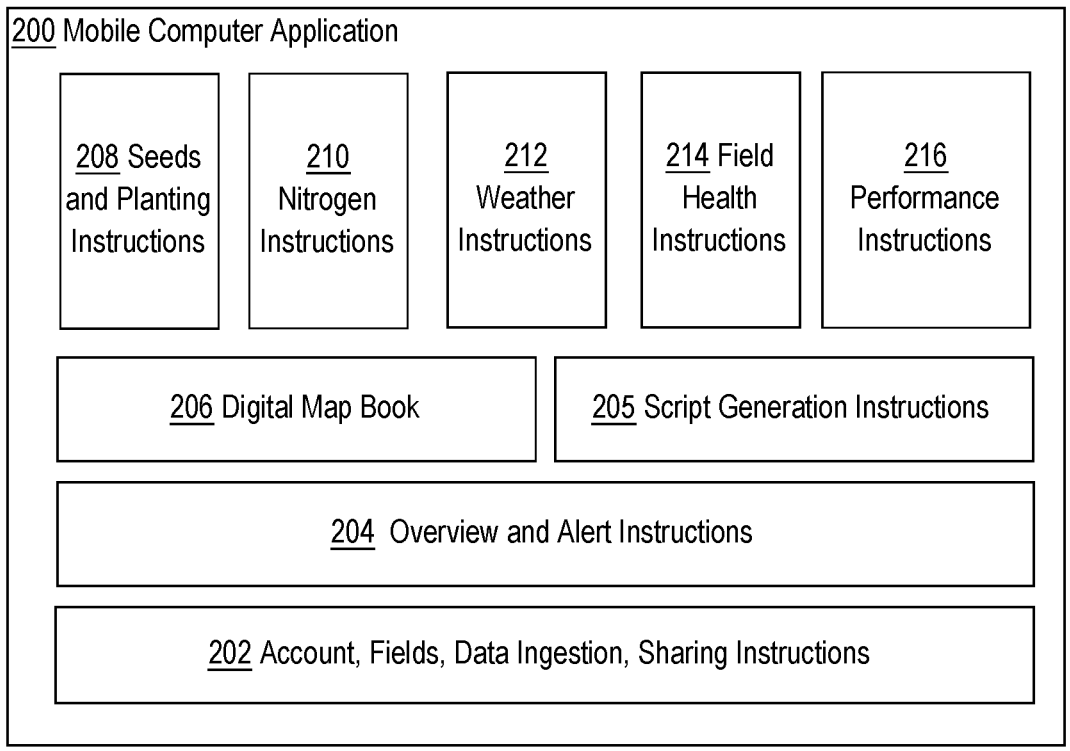
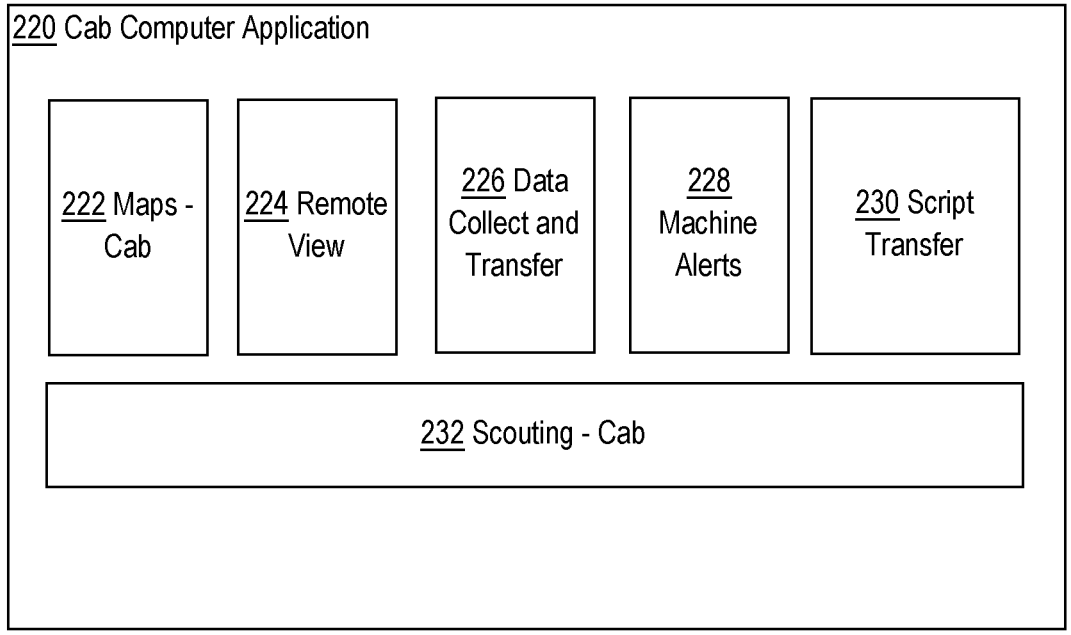

Data Manager

Nitrogen | Planting | Practices | Soil

Planting 1 (4 Fields)
Crop Corn Product
Plant Date: 2016-04-12
ILU 112 | Pop: 34000
[Edit] [Apply]

Planting 2 (0 Fields)
Crop Corn Product
Plant Date: 2016-04-15
ILU 83 | Pop: 34000
[Edit] [Apply]

Planting 3 (0 Fields)
Crop Corn Product
Plant Date: 2016-04-13
ILU 83 | Pop: 34000
[Edit] [Apply]

Planting 4 (1 Fields)
Crop Corn Product
Plant Date: 2016-04-13
ILU 112 | Pop: 34000
[Edit] [Apply]

Add New Planting Plan

| | | CROP | PLANTED ACRES | PRODUCT | RELATIVE MATURITY | TARGET YIELD | POPULATION (AVG) | PLA |
|---|---|---|---|---|---|---|---|---|
| ☐ | Select All | | | | | | | |
| ☐ | Ames, IA 1<br>Corn \| 100 \| Boone, IA | Corn | — | DMC82-M | 112 | 160 | 34000 | Apr |
| ☐ | Austin, MN 1<br>Corn \| 100 \| Fredricks, MN | Corn | — | DMC82-M | 114 | 160 | 36000 | Apr |
| ☐ | Boone, IN 1<br>Corn \| 100 \| Boone, IA | Corn | — | DMC82-M | 112 | 150 | 34000 | Apr |
| ☐ | Champaign 1<br>Corn \| 100 \| Champaign, IL | Corn | — | — | 112 | 200 | 34000 | Apr |
| ☐ | E Nebraska 1<br>Corn \| 100 \| Burt, NE | Corn | — | — | 112 | 160 | 34000 | Apr |

*FIG. 6*

FLAGGING OPERATIONAL DIFFERENCES IN AGRICULTURAL IMPLEMENTS

BENEFIT CLAIM

This application claims benefit under 35 U.S.C. § 119 of Provisional Patent Application No. 62/980,065, the entire contents of which are incorporated by reference as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2021 The Climate Corporation.

FIELD OF THE DISCLOSURE

The present disclosure relates to digital computer modeling and tracking of agricultural fields. Specifically, the present disclosure relates to monitoring agricultural activities of an agricultural implement to identify operational differences in locations on an agricultural field.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Optimizing the planting and management of agricultural fields can be extremely difficult given the vast array of options available to a farmer, including planting techniques, management techniques, and hybrid seeds. To optimize the planting, treatment, and/or harvesting of an agricultural field, data from the agricultural field needs to be analyzed. Yet there are locations on agricultural fields which can negatively impact the value of an analysis, such as locations where compaction occurred on a crop due to multiple machine passes or locations where a crop had access to more resources due to being situated at the edge of a field. Analysis of fields using the yield values from such locations can lead to a decision regarding planting, treatment, harvesting, or other management practices that can negatively impact the agricultural field.

Additionally, trials performed on an agricultural field can be negatively impacted if they occur at locations where yield values vary due to operational abnormalities. For instance, if an area of the field that was affected by compaction is used as a trial where different nutrients are applied, the effect of the different nutrients may be hidden by reduced yield due to the compaction.

Thus, there is a need for a system which can flag specific locations where an operational abnormality occurred based on machine data.

SUMMARY

The appended claims may serve as a summary of the disclosure.

In the drawings:

FIG. 2 illustrates two views of an example logical organization of sets of instructions in main memory when an example mobile application is loaded for execution.

FIG. 6 depicts an example embodiment of a spreadsheet view for data entry.

DETAILED DESCRIPTION

Figure 1:
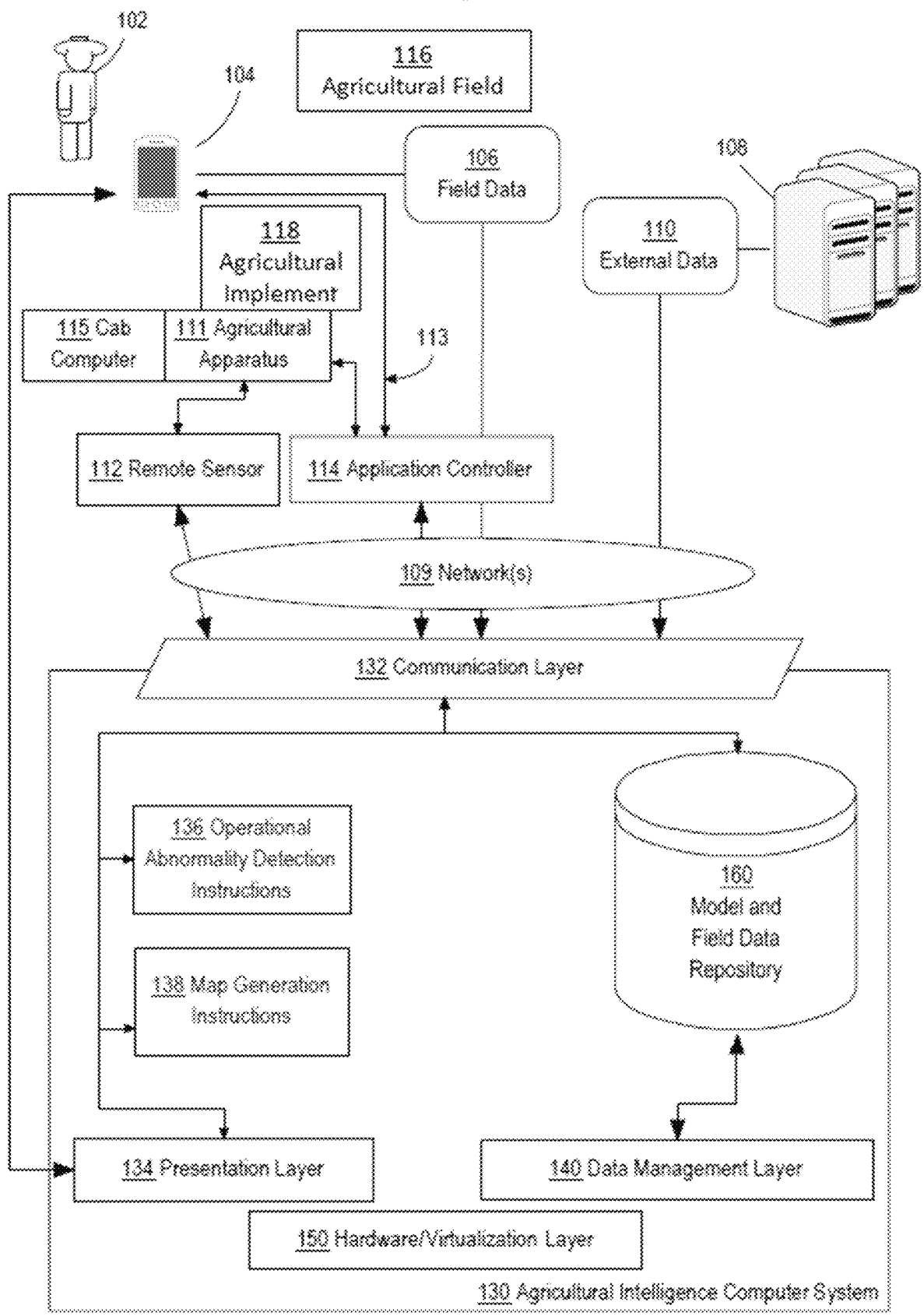
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. General Overview
  2. Example Agricultural Intelligence Computer System
  2.1. Structural Overview
  2.2. Application Program Overview
  2.3. Data Ingest to the Computer System
  2.4. Process Overview—Agronomic Model Training
  2.5. Implementation Example—Hardware Overview
  3. Extensions and Alternatives
  4. Identifying Operational Abnormalities
  4.1. Identifying Edge Passes
  4.2. Identifying End Rows
  4.3. Identifying Point Rows
  4.4. Identifying Passes

1. General Overview

Systems and methods for flagging operational abnormalities are described herein. In an embodiment, a system receives machine data from an agricultural implement performing a task on an agricultural field. Using the machine data, the system identifies a plurality of passes of the agricultural implement. Using the flagged passes and the machine data, the system identifies operational abnormalities in the performance of the task by the agricultural implement, such as identifying end rows, point rows, or edge passes. The system then generates a map of operational abnormalities using the machine data and the identified operational abnormalities.

In an embodiment, a method comprises receiving time-series data captured from an agricultural implement performing an agronomic activity on an agricultural field, the time-series data including, for each of a plurality of timestamps, a location of the agricultural implement; identifying a plurality of passes in the time-series data; using the identified plurality of passes, identifying a plurality of location on the agricultural field in which the activity performed by the agricultural implement included a particular operational abnormality; generating a map of operational abnormalities for the agricultural field, the map of operational abnormalities including the plurality of locations on the agricultural field in which the activity performed by the agricultural implement included the particular operational abnormality.

In an embodiment, identifying the plurality of passes comprises computing a time difference between a first timestamp and a second timestamp; computing a space difference between a location corresponding to the first timestamp and a location corresponding to the second timestamp; computing a heading difference between a heading of the agricultural implement at the first timestamp and a heading of the agricultural implement at the second timestamp; and determining that the time difference is greater than a first threshold value, the space difference is greater than a second threshold value, and the heading difference is greater than a third threshold value and, in response, determining that the second timestamp corresponds to a different pass as the first timestamp.

In an embodiment, identifying the plurality of passes comprises receive heading data identifying a monitored heading of the agricultural implement for each of the plurality of timestamps; calculating, from the time-series data, a calculated heading of the agricultural implement for each of the plurality of timestamps; computing, for the plurality of timestamps, a difference between the monitored heading and the calculated heading; identifying a plurality of peaks of the difference between the monitored heading and the calculated heading; and determining a first timestamp of the plurality of timestamps is a different pass than a second timestamp of the plurality of timestamps based, at least in part, on detecting a peak between the first timestamp and the second timestamp.

In an embodiment, identifying the plurality of passes comprises using the time-series data, generating a heading difference time-series comprising changes in heading of the agricultural implement for a plurality of intervals of time; identifying a peak in the heading difference time-series; and identifying a first pass of the plurality of passes as including locations corresponding to time-series data prior to the peak and a second pass of the plurality of passes as including locations corresponding to time-series data after the peak.

In an embodiment, the particular operational abnormality comprises an edge pass and identifying the plurality of locations on the agricultural field in which the activity performed by the agricultural implement included the particular operational abnormality comprises determining a width of the agricultural implement; determining a boundary of the agricultural field from the time-series data; and identifying each location within the determined width from the boundary of the agricultural field as an edge pass location.

In an embodiment, the particular operational abnormality comprises a point row and identifying the plurality of locations on the agricultural field in which the activity performed by the agricultural implement included the particular operational abnormality comprises determining a width of the agricultural implement; identifying a width of each of the plurality of passes; and determining that a particular width of a particular pass is less than the width of the agricultural implement and, in response, identifying locations within the particular pass as locations on the point row locations.

In an embodiment, the particular operational abnormality comprises an end row and identifying the plurality of locations on the agricultural field in which the activity performed by the agricultural implement included the particular operational abnormality comprises identifying a first timestamp and a second timestamp in the time-series data that include a particular location; and determining that a heading of the agricultural implement for the first timestamp is greater than a threshold value different from a heading of the agricultural implement for the second time stamp and, in response, identifying the particular location as an end row location.

In an embodiment, the method further comprises generating a prescription map corresponding to the map of operational abnormalities which identifies a second activity to perform in the plurality of locations; generating a script which, when executed by a second agricultural implement, causes the second agricultural implement to perform the second activity in the plurality of locations on the agricultural field; and sending the script to the second agricultural implement to cause the second agricultural implement to perform the second activity in the plurality of locations on the agricultural field.

In an embodiment, the method further comprises using the map of operational abnormalities, identifying one or more trial locations on the agricultural field; generating a prescription map which identifies a second activity to perform in the trial locations; generating a script which, when executed by a second agricultural implement, causes the second agricultural implement to perform the second activity in the plurality of locations on the agricultural field; and sending the script to the second agricultural implement to cause the second agricultural implement to perform the second activity in the plurality of locations on the agricultural field.

In an embodiment, the method further comprises receiving yield data for the agricultural field; using the map of operational abnormalities, generating updated yield data for the agricultural field; and generating a yield analysis for the agricultural field excluding the data identified using the map of operational abnormalities.

2. Example Agricultural Intelligence Computer System 2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines, harvesters, sprayers, and cultivators. Application controller 114 is communicatively coupled to agricultural intelligence computer system 130 via the network(s) 109 and is programmed or configured to receive one or more scripts that are used to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, distributed databases, and any other structured collection of records or data that is stored in a computer system. Examples of the RDBMSes include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U.S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
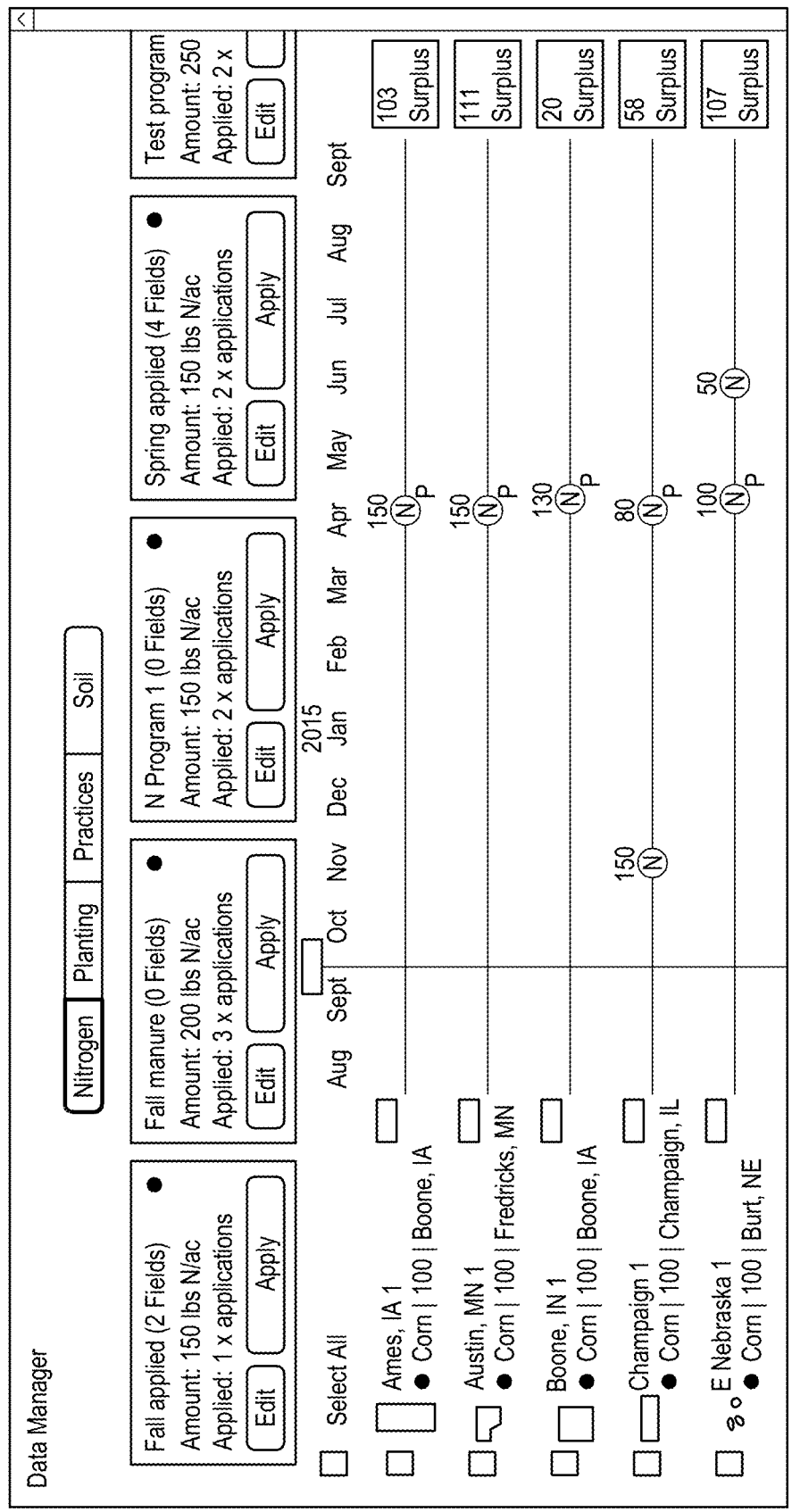
FIG. 5 depicts an example embodiment of a timeline view for data entry.

FIG. 5 depicts an example embodiment of a timeline view for data entry. Using the display depicted in FIG. 5, a user computer can input a selection of a particular field and a particular date for the addition of an event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Spring applied" program selected, which includes an application of 150 lbs N/ac in early April. The data manager may provide an interface for editing a program. In an embodiment, when a particular program is edited, each field that has selected the particular program is edited. For example, in FIG. 5, if the "Spring applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Spring applied" program is no longer being applied to the top field.

While the nitrogen application in early April may remain, updates to the "Spring applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

In an embodiment, operational abnormality detection instructions 136 and map generation instructions 138 comprises a set of one or more pages of main memory, such as RAM, in the agricultural intelligence computer system 130 into which executable instructions have been loaded and which when executed cause the agricultural intelligence computing system to perform the functions or operations that are described herein with reference to those modules. For example, the operational abnormality detection instructions 136 may comprise a set of pages in RAM that contain instructions which when executed cause performing the operational abnormality detection functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of operational abnormality detection instructions 136 and map generation instructions 138 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computing system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Operational abnormality detection instructions 136 comprise computer readable instructions which, when executed by one or more processors, cause agricultural intelligence computer system 130 to perform identifying locations on an agricultural field 116 in which an operational abnormality occurred during implementation of a task by an agricultural implement 118 based on machine data received from the agricultural implement 118. Map generation instructions 138 comprise computer readable instructions which, when executed by one or more processors, cause agricultural intelligence computer system 130 to perform generating a map of an agricultural field which identifies locations that were flagged as including operational abnormalities.

Figure 4:
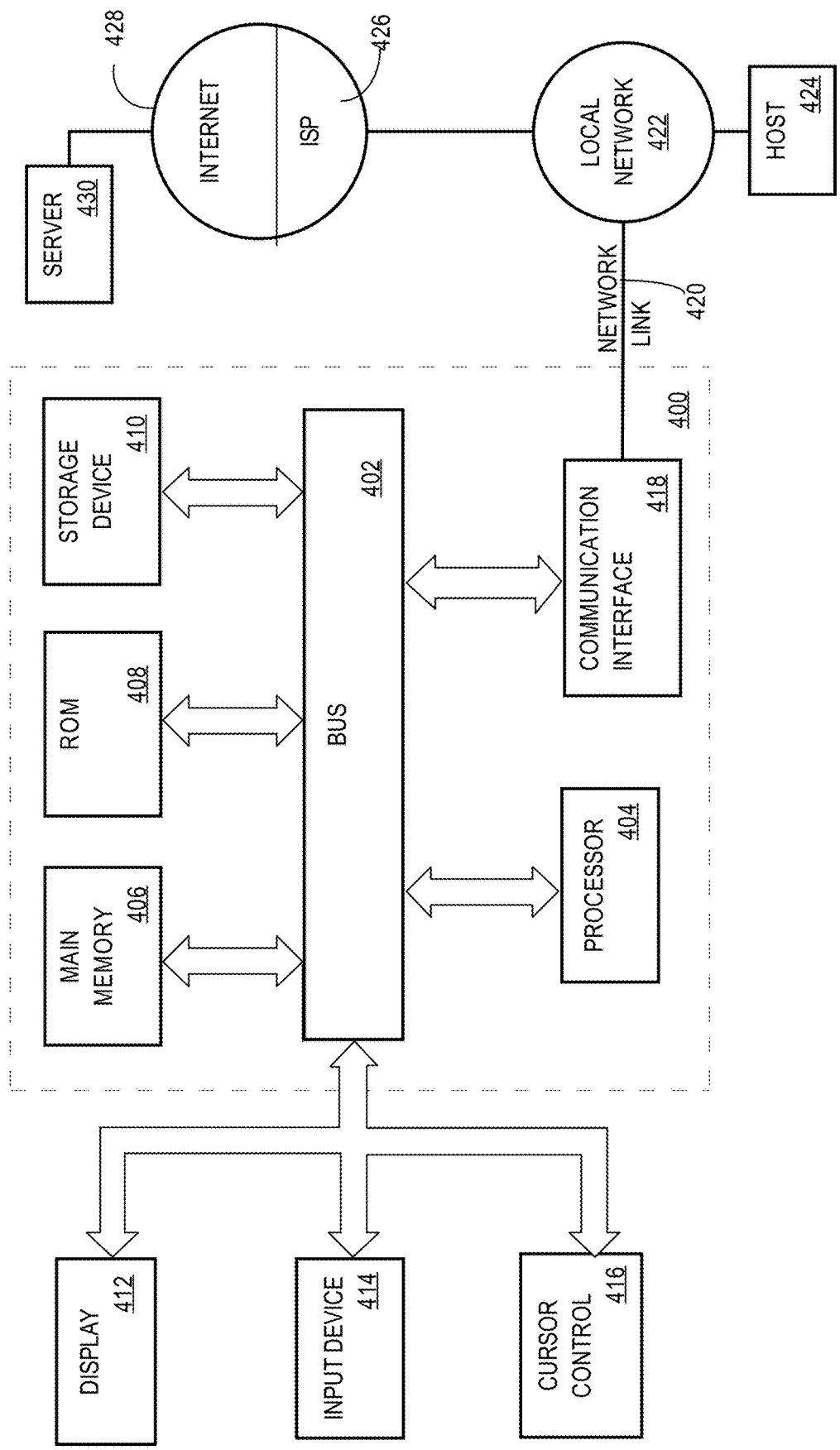
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smartphone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML, and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), Wi-Fi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114 which include an irrigation sensor and/or irrigation controller. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the field manager computing device 104, agricultural apparatus 111, or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or Wi-Fi-based position or mapping apps that are programmed to determine location based upon nearby Wi-Fi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S.

Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4. Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of the quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
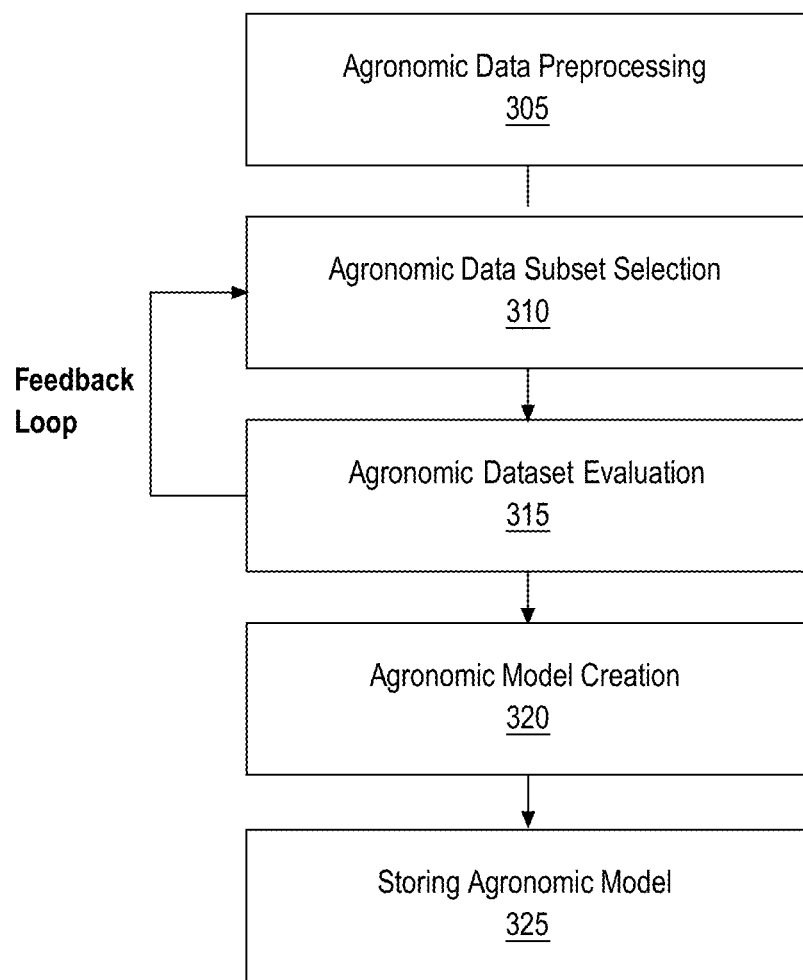
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. Implementation Example—Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

4. Identifying Operational Abnormalities

Embodiments relate to methods for monitoring agricultural implements performing one or more functions on an agricultural field. In an embodiment, an agricultural intelligence computer system receives machine data from an agricultural implement which performs one or more operations on an agricultural field, such as planting, harvesting, or application of a treatment on the agricultural field. The agricultural intelligence computer system may utilize one or more rules based on the machine data to identify locations on the agricultural field to flag. Flagged locations may be removed from analyses of the agricultural field, thereby improving the agricultural intelligence computer system's abilities to monitor the agricultural field and/or react to monitored information of the agricultural field, such as by generating alternative prescriptions based on yield values, causing agricultural implements to apply additional treatments, providing recommendations for actions to be performed on the agricultural field, and/or providing analysis of benefits of one or more treatments or management changes.

In some embodiments, flagged locations are used to determine locations for performing trials on an agricultural field. For example, the system may determine locations for performing trials on the field using, as input, data relating to different locations on the field. Different rules for specifying locations on a field for performing a trial may include minimum area requirements, shape requirements, minimization of in-field variation, or other rules based on previous yield values or field values such as soil properties. The system may be configured to identify and remove flagged locations from the input data used for determining locations for performing the trial, thereby ensuring that a trial is not performed in the flagged locations.

In some embodiments, flagged locations are used to generate prescriptions, such as prescriptions for performing additional actions in flagged locations or trial prescriptions that include particular trials being performed in non-flagged locations. The prescriptions may include planting prescriptions, watering prescriptions, chemical application prescriptions, harvesting prescriptions, or the like. In an embodiment, the prescriptions are used by the system to generate instructions for an application controller of an agricultural implement. The instructions may comprise computer readable instructions which, when executed by the application controller, cause the application controller to control an operating parameter of the agricultural implement to cause the agricultural implement to execute the prescription on an agricultural field. The system may send the instructions to the application controller over a network to cause the application controller to execute the instructions.

As used herein, "flagging locations" refers to storing data for the locations indicating that the locations are different from unflagged locations. For example, the agricultural intelligence computer system may store geospatial data comprising location data for a plurality of locations, such as geospatial coordinates, and one or more corresponding values, such as planted hybrid seed type, planting density, soil data, or other values relating to the location of the corresponding geospatial coordinates. For locations identified using the methods described herein, the agricultural intelligence computer system may additionally store an additional corresponding data value indicating that the location has been flagged for containing operational differences.

In an embodiment, flagging locations may be performed through a layer-based workflow. Layers may be generated for each type of operational difference and vector data may be saved for each layer which identifies locations with the operational abnormality. The vector data may be rasterized and joined with planting, harvest, and/or other data layers. Additionally, or alternatively, the vector data may be spatially joined to one or more other vector layers. Locations in planting, harvest, and/or other data layers that intersect with the operational difference layers may then be identified to be removed from future analyses.

Flagged locations may include locations in which an application or treatment is applied in a manner that can affect yield values. Flagged locations may include edge passes, end passes, point rows, and/or operational abnormalities. In an embodiment, locations are given the same flag regardless of the reason for flagging the location. Additionally, or alternatively, locations may be flagged individually as edge passes, end passes, point rows, and/or operational abnormalities. In some embodiments, operational abnormalities may be passively identified, as the rules for identifying edge passes, end passes, and point rows may identify locations that would be considered operational abnormalities.

Figure 7:
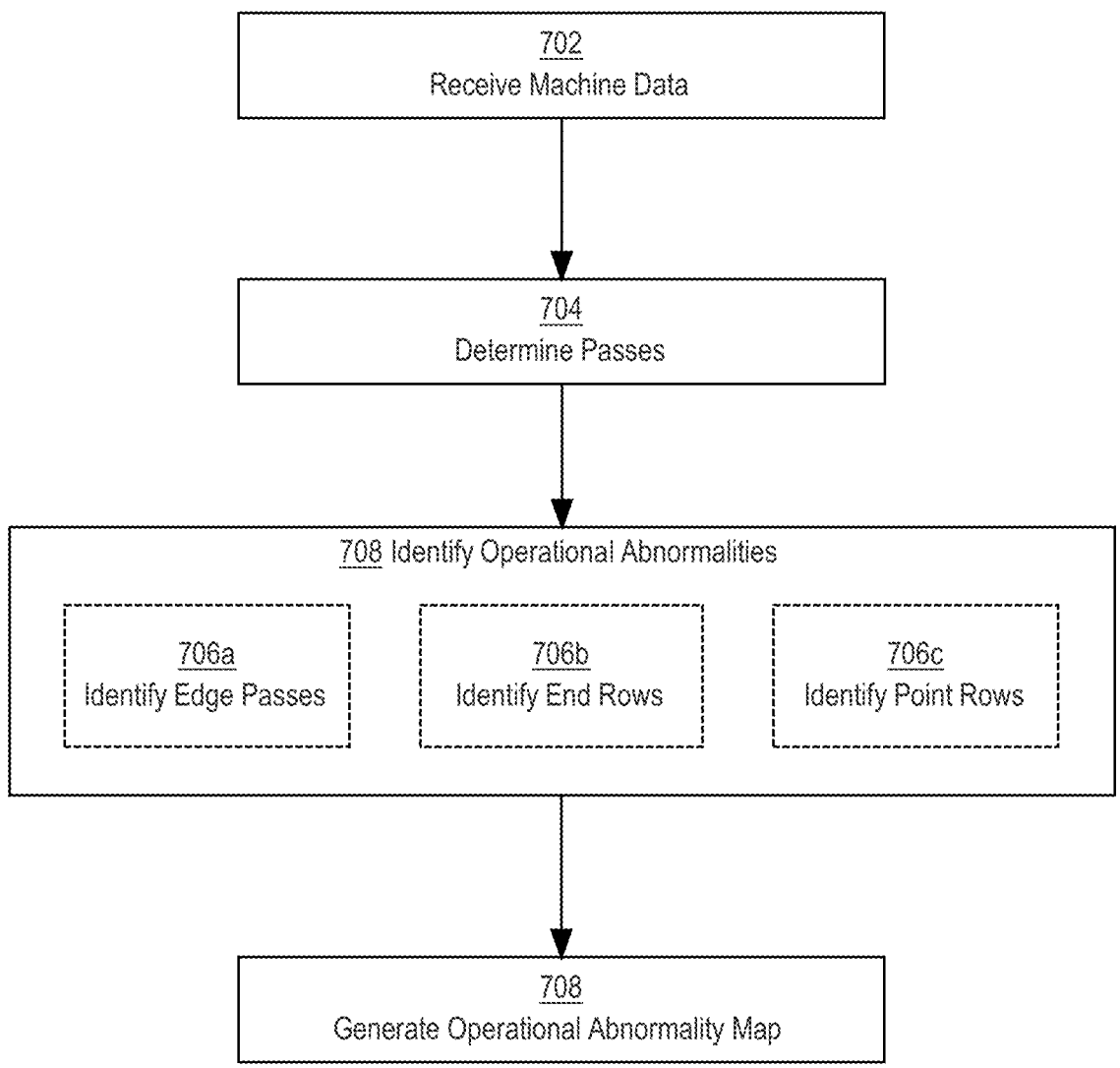
FIG. 7 depicts an example method for flagging locations in a field which include operational abnormalities.

FIG. 7 depicts an example method for flagging locations in a field which include operational abnormalities. Locations with operational abnormalities may comprise locations on an agricultural field that are considered to be at an advantage or disadvantage compared to a rest of the agricultural field due to differences in operation of an implement on the field, such as during planting, harvesting, watering, tillage, nutrient application, or other field activities.

At step 702, machine data is received. The machine data may comprise recorded data from an agricultural implement executing a task on an agricultural field, such as a planter planting a field, a harvester harvesting a crop from the field, or other agricultural implement applying a treatment to the field, such as nutrient application, pesticide application, or water application. The agricultural intelligence computer system may receive the machine data while the agricultural implement is executing the task on the agricultural field and/or after the task has been completed.

The machine data may include a plurality of time entries, each of the time entries including a timestamp and one or more coordinates. The one or more coordinates may be Global Positioning Service (GPS) coordinates of the agricultural implement captured through a GPS receiver on the agricultural implement. The one or more coordinates may comprise coordinates of the machine and/or coordinates of rows of the machine performing the agricultural activity. Additionally, or alternatively, the time entries in the machine data may include GPS coordinates of the agricultural implement and data identifying which rows of the agricultural implement were performing the agricultural activity during a timestamp corresponding to the time entries.

In an embodiment, the machine data comprises a heading of the agricultural implement determined by the agricultural implement. The heading, as used herein, refers to a direction the agricultural implement was moving at each of the timestamps. In an embodiment, the machine data also includes an identifier of the agricultural implement performing the agricultural activity. In an embodiment, the machine data also includes data identifying an agricultural activity being performed. In an embodiment, the machine data also includes data defining a width of the agricultural implement and/or width of a row unit of the agricultural implement. Additionally, or alternatively, the width of the agricultural implement and/or width of the row units of the agricultural implement may be stored by the agricultural intelligence computer system along with an identifier of the agricultural implement. When the agricultural intelligence computer system receives the machine data, the agricultural intelligence computer system may use the identifier of the agricultural implement from the machine data to look up the width of the agricultural implement and/or width of the row units of the agricultural implement from the stored data.

At step 704, passes are determined from the machine data. For example, the agricultural intelligence computer system may label the time entries with pass numbers. Additionally, or alternatively, the agricultural intelligence computer system may store data identifying pass numbers for a range of timestamps, such as "Pass 1: 6:05:02-6:29:18; Pass 2: 6:29:38-6:45:22 . . . " or a range of geographical coordinates. Methods for determining the passes from the machine data are described further herein.

At step 706, operational abnormalities are identified. Identifying operational abnormalities may include one or more of identifying edge passes 706a, identifying end rows 706b, or identifying point rows 706c. Methods for determining operational abnormalities, such as edge passes, end rows, and point rows from the machine data are identified further herein. In an embodiment, the agricultural intelligence computer system labels individual time entries as operational abnormalities. Additionally, or alternatively, the agricultural intelligence computer system may determine ranges of times or physical areas that include operational abnormalities.

At step 708, an operational abnormality map is generated. The operational abnormality map may comprise a geographic map identifying each location or area which includes an operational abnormality determined using the methods described herein. If operational abnormalities are stored for individual time entries or ranges of times, the system may generate the operational abnormality map by determining locations that correspond to the time series data and associating the locations with data indicating the existence of operational abnormalities. For example, the agricultural intelligence computer system may generate polygons that include locations corresponding to time entries that were identified as containing operational abnormalities. Thus, if five time entries in a row included an operational abnormality, the agricultural intelligence computer system may generate a polygon comprising a width of the agricultural implement and/or a total width of the rows performing the task and a length comprising a distance between GPS coordinates of a first time entry and a last entry.

4.1. Identifying Edge Passes

Edge passes may be identified as the edges of the agricultural field. For example, an edge pass may comprise a single machine pass around the edge of a field. The agricultural intelligence computer system may identify edge passes as each location within a threshold distance of a location where the action was not performed, such as eight feet from any location where a crop was not planted.

Figure 8:
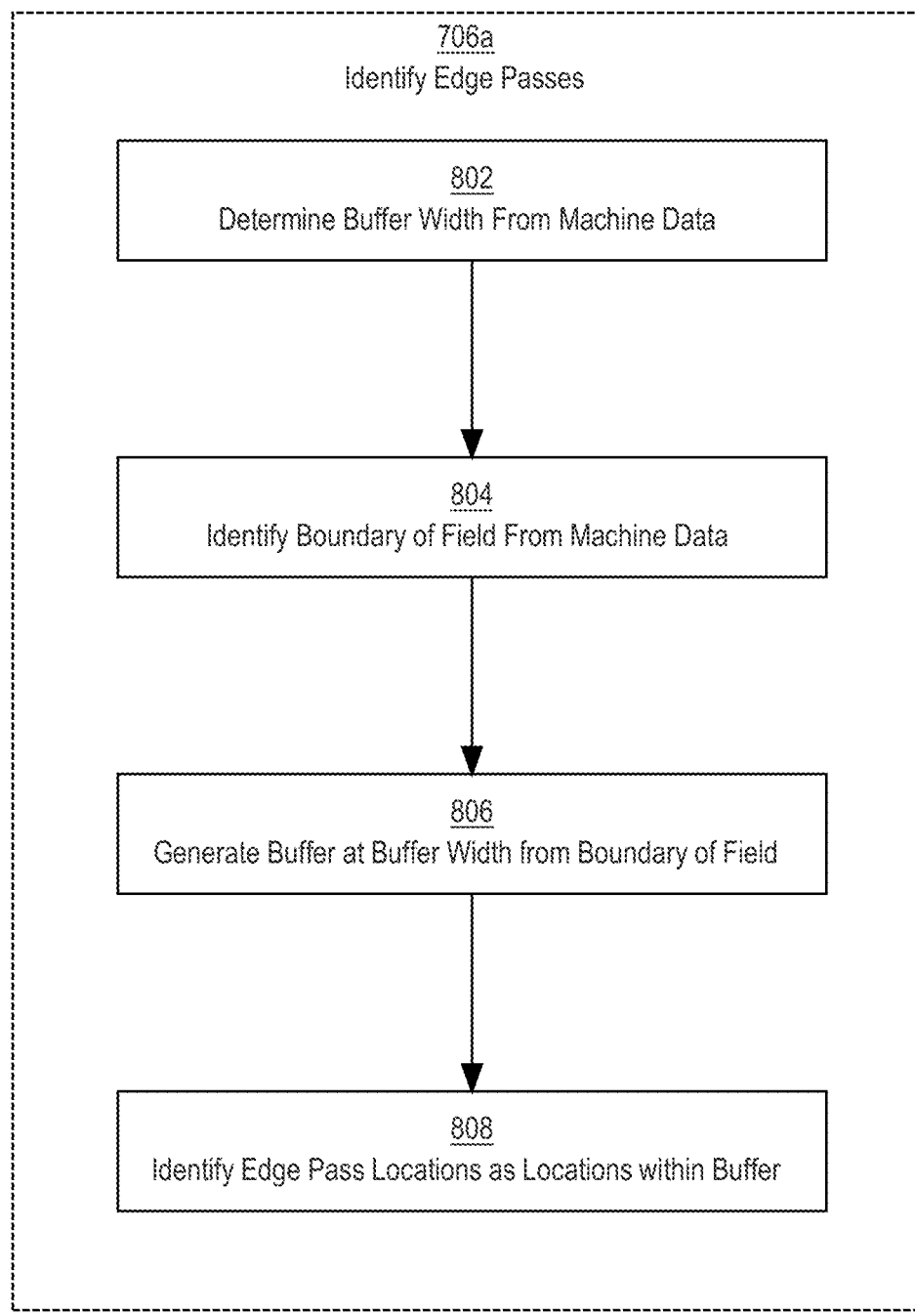
FIG. 8 depicts an example method of identifying edge passes.

FIG. 8 depicts an example method of identifying edge passes. At step 802, the system identifies a buffer width from the machine data. The buffer width may comprise a width of the agricultural implement and/or a width of a combination of all rows of the agricultural implement combined. The row width or implement width may be received as part of the machine data or identified in stored data based on an identifier of the agricultural implement received as part of the machine data. Additionally, or alternatively, other methods may be used for determining the buffer width, such as basing the buffer width on a stored threshold value or on a type of activity performed on the field.

At step 804, the system identifies a boundary of the field from the machine data. For example, the system may determine a shape of the field based on the GPS coordinates of the agricultural implement planting through the field. In an embodiment, an edge of a field is identified if a location on one side of the edge corresponds to GPS data of the agricultural implement while the other side of the edge does not correspond to GPS data. Additionally, or alternatively, an edge may be determined as a first location in a direction that does not correspond to machine data and that does which is not within a particular distance of machine data in the direction. Thus, a location in the center of a field that was skipped by the agricultural implement may not be considered part of the boundary as other locations that were planted, treated, or harvested are within a threshold distance of in each direction.

At step 806, the system generates a buffer at a buffer width from the boundary of the field. For example, the system may identify each location within the buffer width from the boundary of the field as belonging to the buffer. At step 808, the system identifies edge passes as locations with the buffer. Identifying the edge passes may include storing data identifying time entries or locations as comprising edge pass locations. Additionally, or alternatively, the system may create polygons comprising geometric shapes which include all locations within the buffer width from the boundary of the field.

4.2. Identifying End Rows

End rows may be identified as locations in the field where an agricultural implement had to turn around for a next pass. The determinations of end passes may be based on determinations of the header of an agricultural implement. For example, the agricultural intelligence computer system may compare a header of the agricultural implement at a particular location with the header of the agricultural implement at surrounding locations.

Figure 9:
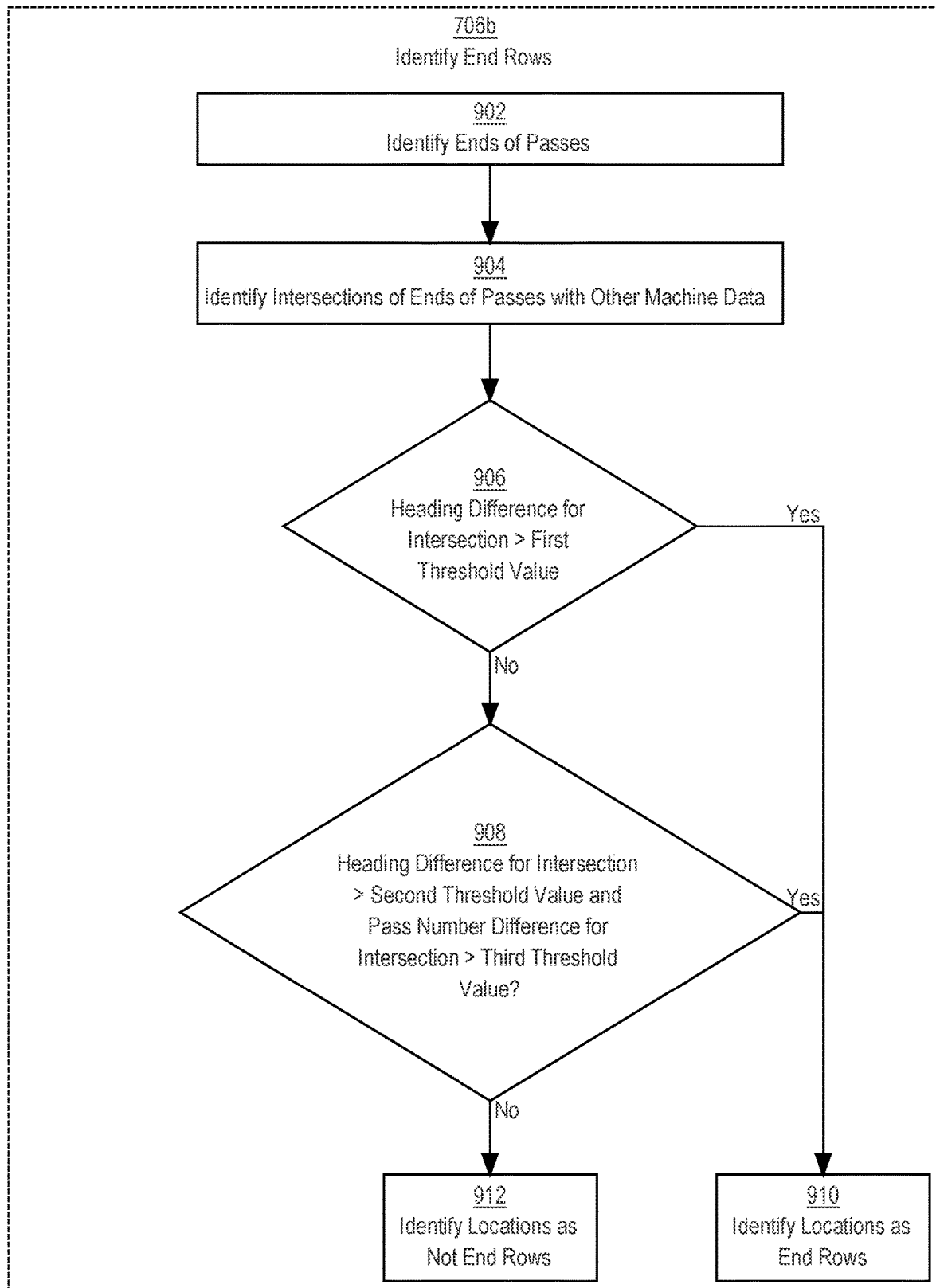
FIG. 9 depicts an example method of identifying end rows.

FIG. 9 depicts an example method of identifying end rows. At step 902, the system identifies ends of passes. For example, for a particular pass number, the system may identify a first number of time entries and a last number of time entries, such as first ten and last ten time entries, as ends of the pass. Additionally, or alternatively, the ends of passes may be determined based on time or distance. For instance, the ends of passes may be determined as including the first and last five seconds of a pass or the first and last ten feet of a pass.

At step 904, the system identifies intersections of ends of passes with other machine data. For example, the agricultural intelligence computer system may determine, for each location in an end pass, if the location overlaps with a location in a different pass. In an embodiment, step 902 is performed with polygons generated from time entry data. For example, the system may generate polygons that comprise a width of the agricultural implement that includes one or more time entries of data. The system may identify ends of passes as a last number of polygons combined into a single end of pass polygon and may identify intersections as any end of pass polygon that overlaps with any other polygon and/or any other location from the time entries.

At step 906, the system determines if a heading difference for the intersection is greater than a threshold value. For example, the system may receive heading data for each time entry and/or may compute a heading for each time entry based on a GPS location of the time entry and a GPS location of a next time entry. In an embodiment, heading values are normalized to 180° such that headings in an exact opposite direction are treated as being the same. The system may compute a difference between headings of overlapping locations. If the difference is greater than a threshold value, such as sixteen degrees, at step 910, the system may identify the locations as end rows. If an end of a pass overlaps with a plurality of different time entries, the system may compute the difference between headings for each overlapping time entry and determine the location is an end row location if any of the differences are greater than the threshold value.

If the heading difference for overlapping locations is not greater than the first threshold value, at step 908, the system determines if the heading difference is greater than a second threshold value and if the pass number difference for the intersection is greater than a third threshold value. For example, the system may use a lower threshold for the heading difference and add a threshold for a pass number difference. As an example, if the first threshold for heading difference was sixteen degrees as discussed above, the second threshold difference may be eight degrees with a pass difference threshold of two. If both the heading difference and pass difference exceed their respective thresholds in step 908, at step 910, the system may identify the locations as end rows.

If either of the criteria of step 908 are not met, at step 912, the system identifies the locations as not end rows. The system may then proceed to evaluating a next pair of overlapping locations. If a location in a time entry of the ends of a pass overlaps with a plurality of other time entries, the system may evaluate each overlap as described in steps 906 and 908 until the locations are identified as end rows or until each combination has been evaluated.

4.3. Identifying Point Rows

Point rows may be identified as locations in the field where, based on machine data, the agricultural intelligence computer system determines that a machine was not running at full capacity. For example, machine data received by the agricultural intelligence computer system may indicate, at each location, operational parameters of the machine, such as how many rows are being planted, harvested, or otherwise treated. Each location where the machine data indicates that the machine was operating at less than full capacity, such as planting only 12 of 24 rows or harvesting 6 of 8 rows, may be identified as a point row.

Figure 10:
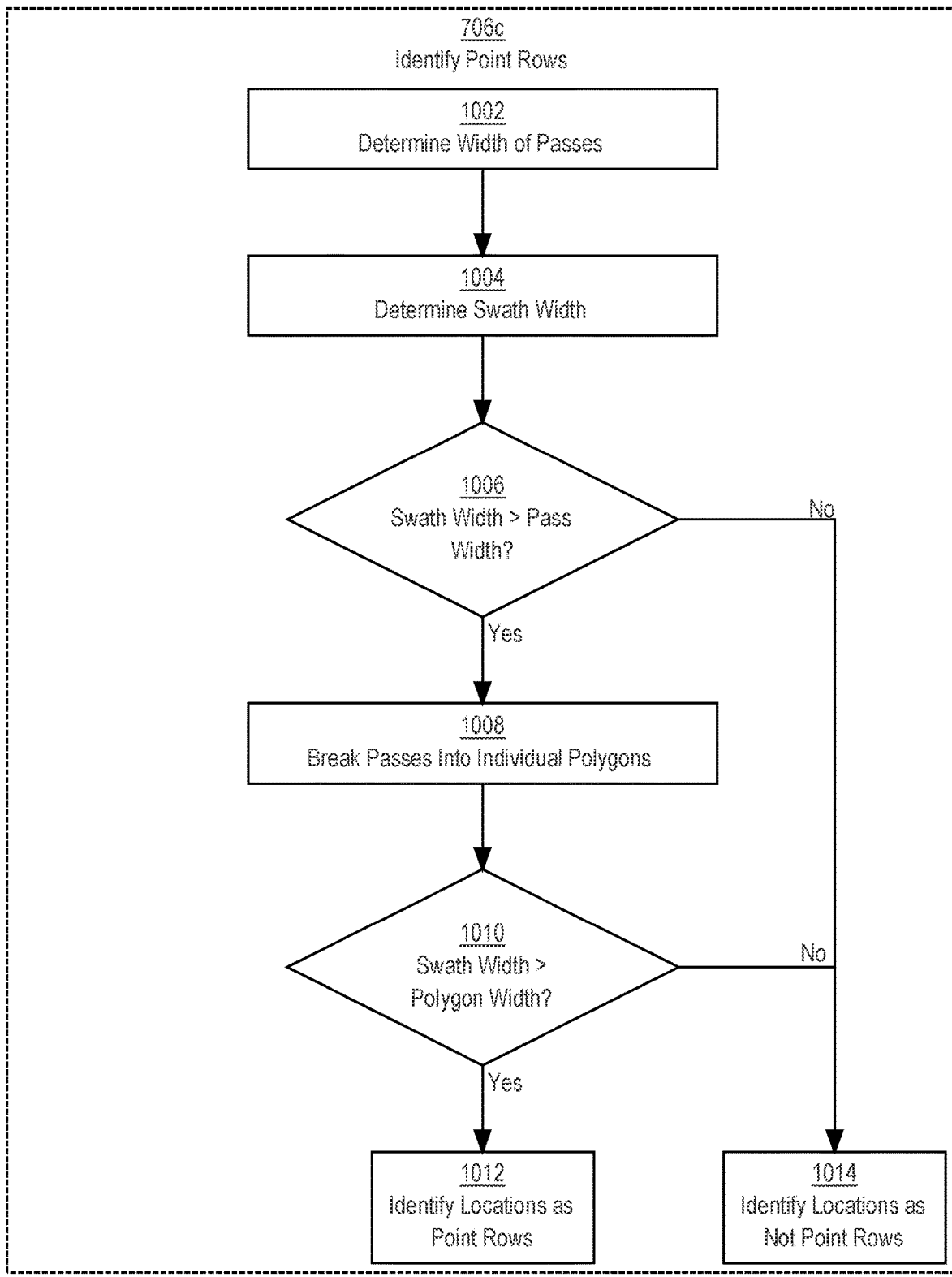
FIG. 10 depicts an example method of identifying point rows.

FIG. 10. depicts an example method of identifying point rows. To determine point rows, the agricultural intelligence computer system may receive, as the machine data, data indicating a number of row units performing an agricultural activity at each time entry. The system may also receive or identify data indicating a width of the agricultural implement and/or a width of individual row units of the agricultural implement.

At step 1002, a width of passes is determined. For example, for each labeled pass, the system may compute an average width of the pass. Computing the average width of the pass may comprise computing a width for each time entry in the pass and computing an average of the widths. The width for each time entry may be computed based on a number of row units performing an agricultural activity. For example, if an agricultural implement has eighteen rows, each five feet wide, with ten of the row units performing the agricultural activity at a particular timestamp, the system may compute the width for the time entry with the particular timestamp as fifty feet.

At step 1004, a swath width is determined. The system may compute the swath width as a total width of all rows of the agricultural implement. Thus, if an agricultural implement has eighteen rows, each five feet wide, the swath width may be computed as 90 feet wide.

At step 1006, the system determines if a swath width is greater than the pass width. For example, the system may compare the average width computed in step 1002 with the swath width for the agricultural implement determined in step 1004. If the swath width does not exceed the pass width, at step 1014 the system identifies the locations as not comprising point row locations. Identifying the locations as not comprising point rows may comprise storing data indicating that the locations are not point rows or, alternatively, not storing data identifying the locations as point rows. The system may then proceed to evaluate a next pass.

If the swath width is not greater than the pass width, at step 1008, the passes are broken up into individual polygons. For example, the system may generate passes from a plurality of polygons generated from one or more time entries. The system may break the passes back up into the original polygons. Additionally, or alternatively, the system may generate polygons from the time entries that make up a particular pass. Each polygon may comprise one or more time entries. In an embodiment, time entries are grouped based on a number of row units that are performing the agricultural activity. Thus, if five entries in a row include fifteen row units planting, the system may generate a polygon comprising the locations of the five entries.

At step 1010, the system determines if the swath width is greater than a polygon width. If so, at step 1012, the locations of the polygon are identified as point rows. If the swath width is not greater than the polygon width, at step 1014, the system identifies the locations as not point rows. By first comparing the pass width to the swath width, the system initially removes passes from consideration that do not include any point rows, thereby decreasing a load on the computing system in identifying point rows from the machine data. Once passes that could include point rows are identified, the system then searches through the individual polygons to find and identify point rows.

4.4. Identifying Passes

Passes may be identified as groupings of locations that are treated as having had a single instance of an agricultural task performed on them. For example, when an agricultural implement performs an agricultural task in a West direction, each location where the task was performed would be part of a same pass. When the agricultural implement turns around and performs the agricultural task in the East direction, each location where the task is performed in the East direction would be part of a second pass. In some embodiments, passes may be determined manually. For example, a field manager computing device may send data to the agricultural intelligence computer system indicating a start of a new pass at different instances within the timestamps of the machine data, such as based on user input.

Figure 11:
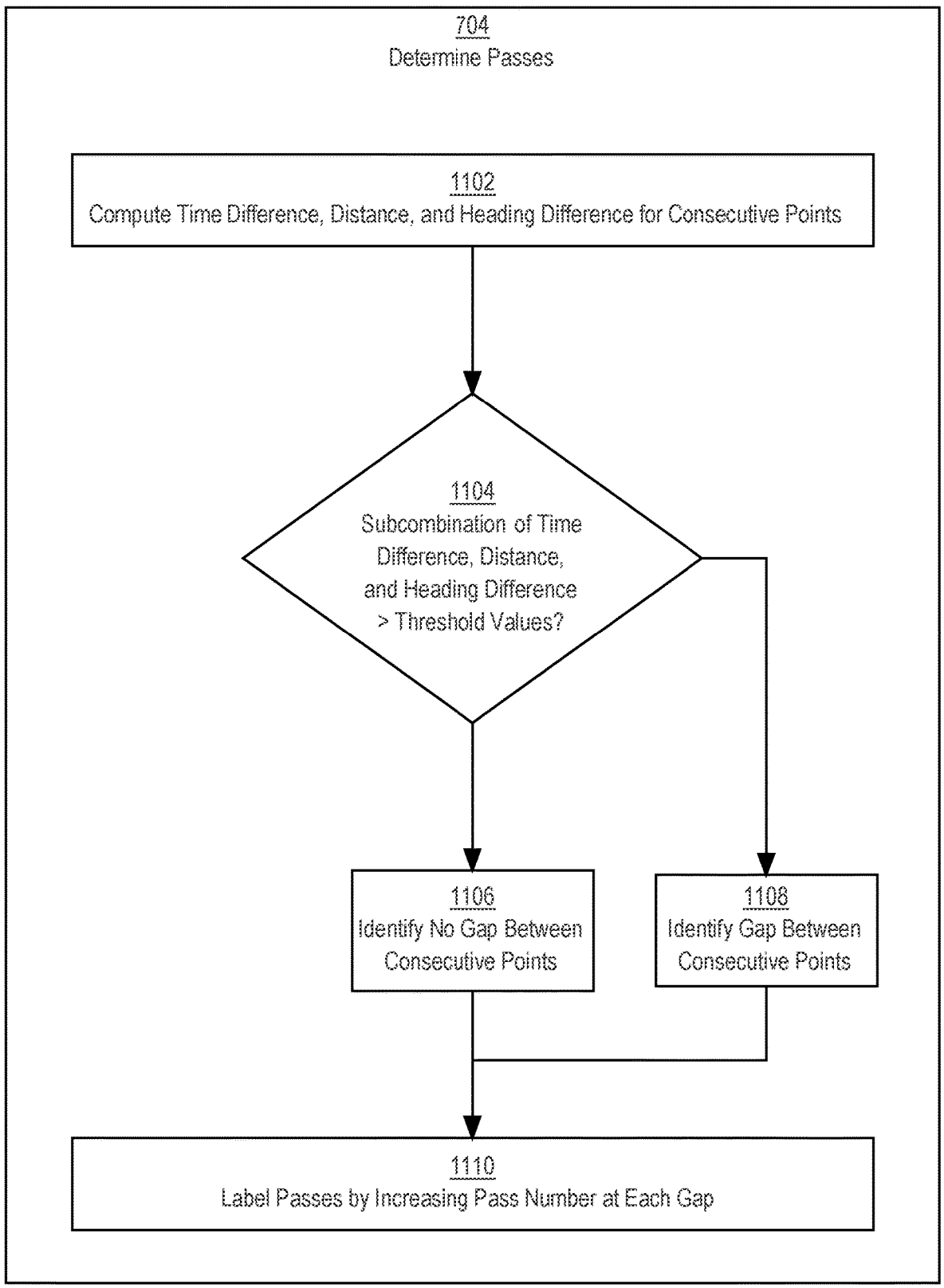
FIG. 11 depicts a first method of determining passes.

FIG. 11 depicts a first method of determining passes. At step 1102, a time difference, distance, and heading difference is computed for consecutive points. Consecutive points, as used herein, refers to two time entries with consecutive timestamps. In an embodiment, the agricultural implement generates time entries when the task is being performed. Thus, different pairs of consecutive timestamps may comprise different gaps in time. For each pair of consecutive points, the system may compute the difference in timestamps, a difference in location of the agricultural implement based on the GPS data, and/or a difference in heading of the agricultural implement based on data received from the agricultural implement identifying a heading for each time entry.

At step 1104, the system determines if a sub-combination of the time difference, distance, and heading difference is greater than stored threshold values. The stored threshold values may be static numbers and/or may be based on the machine data, such as being computed based on median time differences or spatial differences between points. In an embodiment, the sub-combination is all three of the time difference, distance, and heading. For example, the system may determine if the time difference is greater than four seconds over a median time difference, if the distance is greater than 1.25 times the median difference and if the heading difference is greater than 10°. If so, at step 1108, a gap is identified between consecutive points.

In an embodiment, the sub-combination includes a plurality of sub-combinations. For example, a first sub-combination may include thresholds for all three of the time difference, distance, and heading difference. A second sub-combination may include thresholds for only the time difference and heading difference with one or more threshold values being higher for the second sub-combination than the first sub-combination.

If the sub-combination of time difference, distance, and heading difference is not greater than the stored threshold values, at step 1106, no gap is identified between the consecutive points. The system may then proceed with evaluating a next grouping of consecutive points.

At step 1110, passes are labeled by increasing a pass number at each gap. For example, the system may label every time entry prior to a first gap with a first pass number and every time entry after the first gap but prior to a second gap with a second pass number. In an embodiment, polygons are generated for individual passes based on the locations in the time entries and a width of the agricultural implement that is performing the task. Generating the polygon may comprise connecting the points representing the ends of the agricultural implement at each location in the time series data. Thus, the shape of the polygon may be a rectangle if the agricultural implement moved in a straight line and used a same number of rows to perform the task for the entire length of the pass, but may comprise a more complex shape if the agricultural implement turned, such as to avoid an obstruction, or reduced/increased a number of row units performing a task during the pass.

Figure 12:
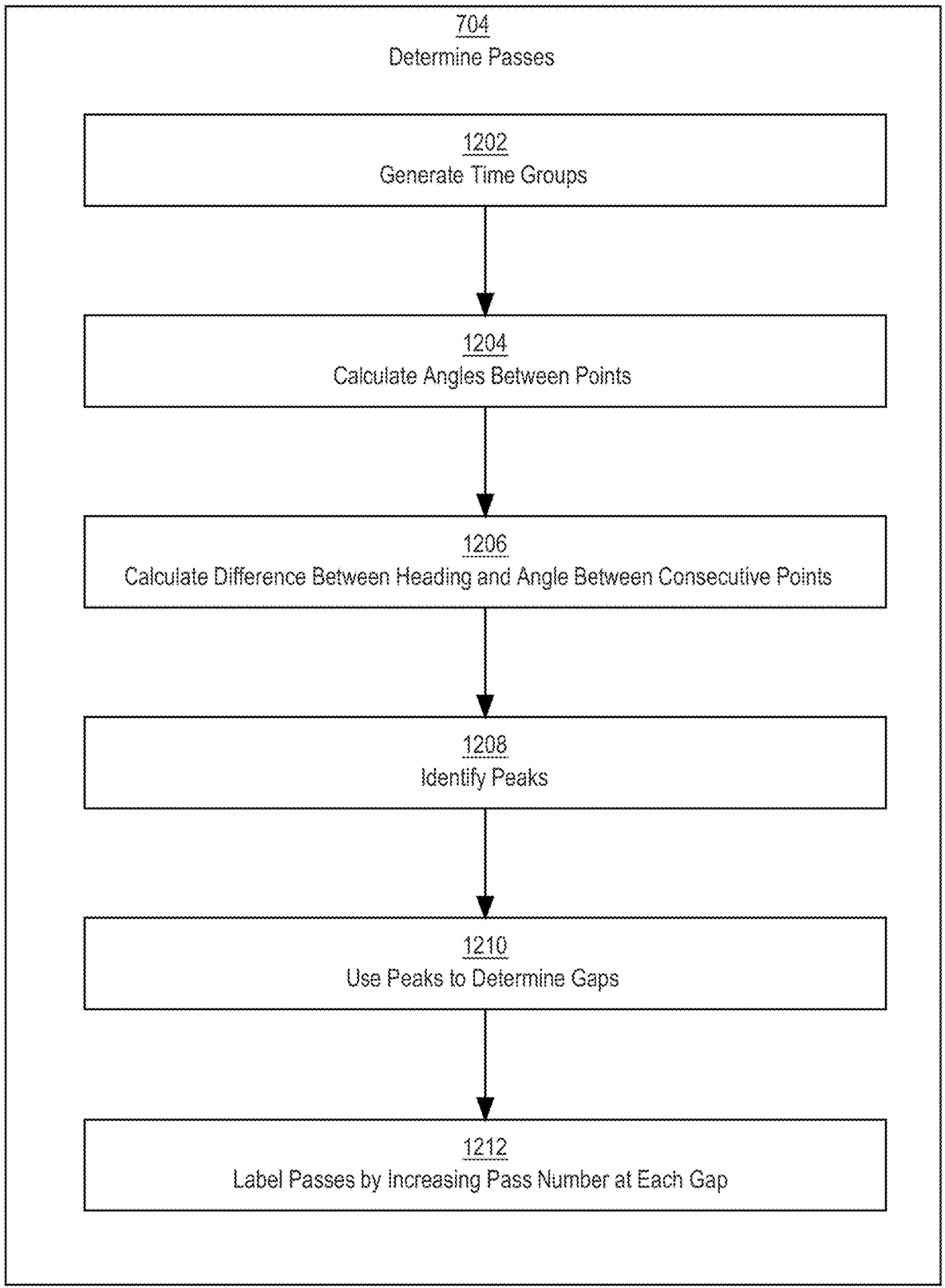
FIG. 12 depicts a second method of determining passes.

FIG. 12 depicts a second method of determining passes. At step 1202, a plurality of time groups is generated from the machine data. Generating the time groups may comprise ordering the machine data by time based on the timestamps and creating time groups for each grouping of points where a time difference between a first timestamp and last timestamp is greater than a threshold value, such as two seconds. Time groups with less than a threshold number of time entries, such as three, may be removed, thereby removing noise from the model. In an embodiment, step 1202 may be performed to remove entries that would negatively impact results of the computation. In other embodiments, step 1202 may not be performed or may be replaced by a different method of removing such entries.

At step 1204, angles are calculated between points. For example, the system may generate polygons from the time groups and/or from individual time entries. For each polygon, the system may identify a center coordinate for the polygon. The system may then compute an angle for the center coordinate of the polygon based on a location of a center point of a previous polygon and a particular direction. For instance, the angle may comprise an angle between the two points and a latitude or longitude line.

At step 1206, a difference between a heading value and the angle between consecutive points is computed. For example, the heading value may comprise an angle between the direction of the agricultural implement and the particular direction. Thus, if the agricultural implement has not changed direction, the difference between the angle for the center coordinate of the polygon and the heading would be 0.

At step 1208, a plurality of peaks is identified in the differences between heading and angle. For example, the agricultural intelligence computer system may use a peak finding algorithm, such as scipy.signal.find_peaks from a standard Python package, to identify peaks in the differences between heading and angle from the plurality of points. The system may identify each location with a peak greater than a threshold value, such as 20 degrees.

At step 1210, the peaks are used to determine gaps. For example, the system may compute a median distance between peaks. The system may determine a gap exists between consecutive time entries if a difference in time between the time entries is greater than a threshold value, such as two seconds, and a distance is greater than a second threshold value related to the media distance between peaks, such as ⅓ times the median distance between peaks. Additionally, or alternatively, the system may determine a gap exists between consecutive time entries if a difference in time is greater than a threshold value, a peak was detected, and a distance between the points is greater than a second threshold value related to a median distance between points, such as 1.5 times the median distance between points.

At step 1212, passes are labeled by increasing a pass number at each gap. For example, the system may label every time entry prior to a first gap with a first pass number and every time entry after the first gap but prior to a second gap with a second pass number.

Figure 13:
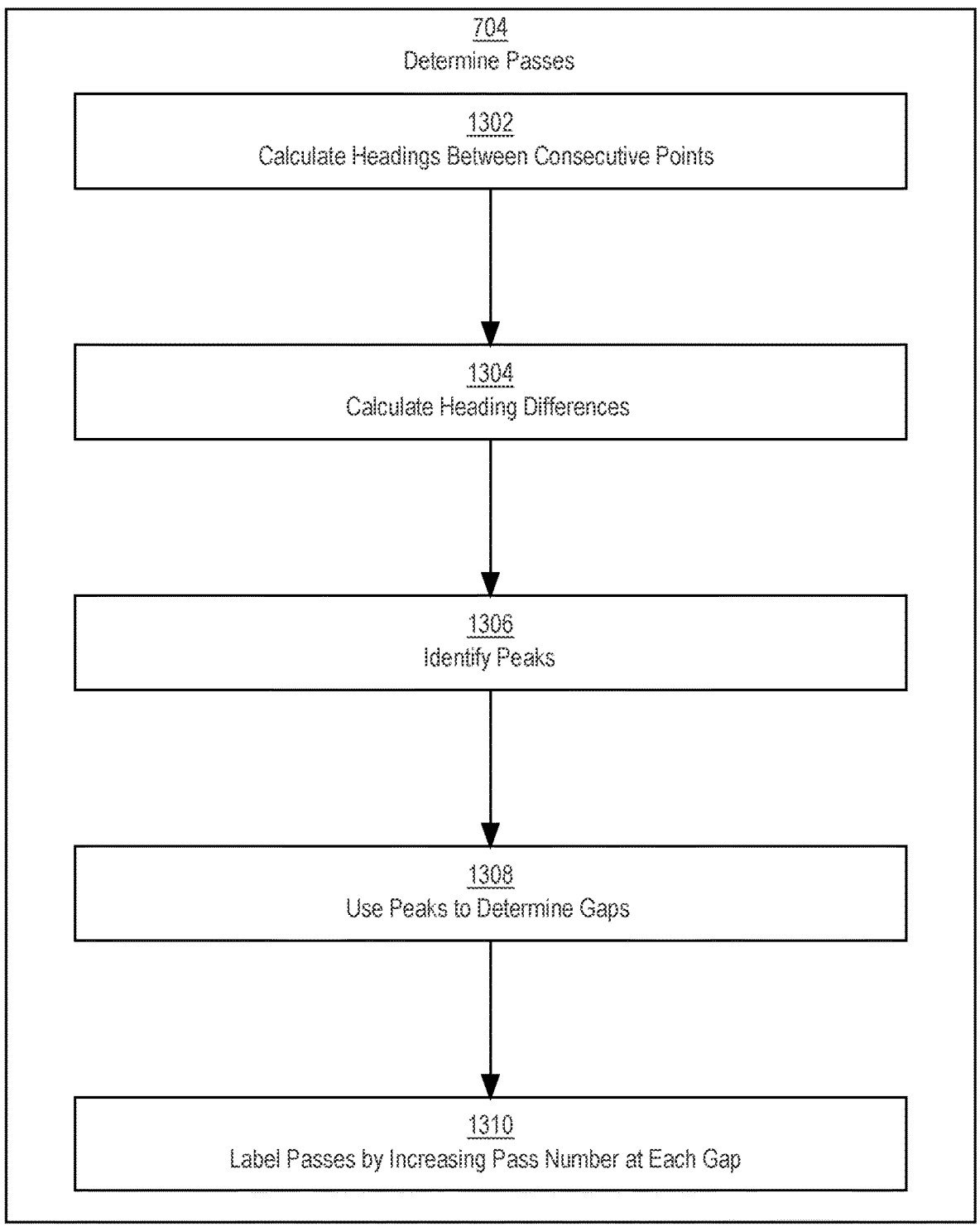
FIG. 13 depicts a third method of determining passes.

FIG. 13 depicts a third method of determining passes. At step 1302, the system calculates headings between consecutive points. For example, the system may determine a central coordinate for the agricultural implement based on the GPS data for each time entry. The system may compute a heading direction based on the locations of central coordinates for consecutive time entries with the direction comprising a direction from a location corresponding to an earlier timestamp to a location corresponding to a later time stamp. For example, an equation for the heading may comprise heading=arctan (x'−x, y'−y) where (x', y') and (x', y') comprise coordinates for consecutive time entries.

In an embodiment, prior to calculating the headings, the system resamples the time entries based on distance. This keeps time entries from stationary machines or time entries that occur after extended breaks from negatively affecting the heading calculation. After resampling the time entries, the system may compute the central coordinates for each resampled point. In order to remove possible noise, the system may pass the X and Y coordinates of the computed central coordinates through a low pass filter and use the filtered points to calculate the heading. The low pass filter may comprise a threshold applied to a frequency of data points. Thus, if time entries are received at a frequency of 1 hz and the threshold is set to 0.2 hz, portions of the time entries with frequencies above 0.2 hz may be attenuated, thereby resulting in a smoother signal.

At step 1304, the system calculates heading differences between consecutive headings. For example, the system may compute, for a given time entry, a heading between a previous time entry and the given time entry and a heading between the given time entry and a next time entry. The system may compute a difference between the two headings and store the difference for the given time entry. The system may repeat this process with each time entry, thereby generating a plurality of difference values sequenced by time.

At step 1306, a plurality of peaks are identified in the differences between consecutive headings. For example, the system may use a peak finding algorithm, such as scipy.signal.find_peaks from a standard Python package, to identify peaks in the differences between consecutive headings.

At step 1308, the peaks are used to determine gaps. For example, the system may determine that each peak corresponds to a gap. Additionally, or alternatively, the system may determine that a gap exists based on other factors, such as distance or time along with the existence of peaks. In an embodiment, passes under a threshold size, such as ten time entries, are merged with a preceding or subsequent pass, thereby removing portions of a turn as being separate passes.

At step 1310, passes are labeled by increasing a pass number at each gap. For example, the system may label every time entry prior to a first gap with a first pass number and every time entry after the first gap but prior to a second gap with a second pass number.

While identifying passes is depicted in FIG. 7 as part of the method for flagging locations as abnormalities, the pass detection methods described herein may provide additional benefits and be used outside of the method of FIG. 7. For example, passes may be used to determine how to control an agricultural implement performing future activities on the field, thereby allowing additional applications to follow a same path. Additionally, or alternatively, the passes may be used to determine locations for a trial, such as splitting a plurality of passes into different zones where a trial is implemented in one or more of the zones. In such embodiments, based on the pass information, the system may generate a prescription map. The prescription map may be used to generate computer readable instructions which, when executed by an application controller of an agricultural implement, cause the application controller to control an operating parameter of the agricultural implement to cause the agricultural implement to perform a task according to the prescription map.

In other embodiments, pass determination may be used to generate graphical user interfaces, such as generating a visualization of the agricultural field with individual passes identified and/or selectable for providing additional information and/or augmenting a prescription map for the individual passes. Passes may also be used to join machine data from different sources, such as joining as-planted data to harvest data, thereby allowing the system to correlate planting characteristics with yield.

Technical Effects

The systems and methods described herein improve the tracking of agricultural implements performing tasks on agricultural fields by identifying portions of machine data that correspond to operational abnormalities. Technical benefits of the systems and methods described herein include improving crop models by removing "noise" from machine data inputs and improved tracking of agricultural implements performing automated activities. Additionally, the systems and methods described herein may be used to identify locations on an agricultural field to perform future tasks, such as implementing a trial or applying additional treatments. The identified locations may be used generate prescription maps which are then used to automate machinery to implement a prescription on the agricultural field. Thus, control of agricultural implements to perform future tasks are improved through the identification of operational abnormalities in previous functions of agricultural implements.

What is claimed is:

1. A system comprising:
one or more processors;
a memory storing instructions which, when executed by the one or more processors, causes performance of:
receiving time-series data captured from an agricultural implement performing an agronomic activity on an agricultural field, the time-series data including, for each of a plurality of timestamps, a location of the agricultural implement;
identifying a plurality of passes in the time-series data including:
computing a time difference between a first timestamp and a second timestamp;
computing a space difference between a location corresponding to the first timestamp and a location corresponding to the second timestamp;
computing a heading difference between a heading of the agricultural implement at the first timestamp and a heading of the agricultural implement at the second timestamp; and
determining that the time difference is greater than a first threshold value, the space difference is greater than a second threshold value, and the heading difference is greater than a third threshold value and, in response, determining that the second timestamp corresponds to a different pass as the first timestamp;
using the identified plurality of passes, identifying a plurality of locations on the agricultural field in which the activity performed by the agricultural implement included a particular operational abnormality, the particular operational abnormality including an edge pass, a point row or an end row; and
generating a map of operational abnormalities for the agricultural field, the map of operational abnormalities including the plurality of locations on the agricultural field in which the activity performed by the agricultural implement included the particular operational abnormality.

2. The system of claim 1, wherein the particular operational abnormality comprises the edge pass and wherein identifying the plurality of locations on the agricultural field in which the activity performed by the agricultural implement included the particular operational abnormality comprises:
determining a width of the agricultural implement;
determining a boundary of the agricultural field from the time-series data; and identifying each location within the determined width from the boundary of the agricultural field as an edge pass location.

3. The system of claim 1, wherein the particular operational abnormality comprises the end row and wherein identifying the plurality of locations on the agricultural field in which the activity performed by the agricultural implement included the particular operational abnormality comprises:
- identifying a first timestamp and a second timestamp in the time-series data that are associated with a particular location; and
- determining that a heading of the agricultural implement for the first timestamp is different from a heading of the agricultural implement for the second time stamp by a threshold value and, in response, identifying the particular location as an end row location.

4. The system of claim 1, wherein the instructions, when executed by the one or more processors, further cause performance of:
- generating a prescription map corresponding to the map of operational abnormalities which identifies a second activity to perform in the plurality of locations;
- generating a script which, when executed by a second agricultural implement, causes the second agricultural implement to perform the second activity in the plurality of locations on the agricultural field; and
- sending the script to the second agricultural implement to cause the second agricultural implement to perform the second activity in the plurality of locations on the agricultural field.

5. The system of claim 1, wherein the instructions, when executed by the one or more processors, further cause performance of:
- using the map of operational abnormalities, identifying one or more trial locations on the agricultural field;
- generating a prescription map which identifies a second activity to perform in the trial locations;
- generating a script which, when executed by a second agricultural implement, causes the second agricultural implement to perform the second activity in the plurality of locations on the agricultural field; and
- sending the script to the second agricultural implement to cause the second agricultural implement to perform the second activity in the plurality of locations on the agricultural field.

6. The system of claim 1, wherein the instructions, when executed by the one or more processors, further cause performance of:
- receiving yield data for the agricultural field;
- using the map of operational abnormalities, generating updated yield data for the agricultural field; and
- generating a yield analysis for the agricultural field excluding the data identified using the map of operational abnormalities.

7. A method comprising:
- receiving time-series data captured from an agricultural implement performing an agronomic activity on an agricultural field, the time-series data including, for each of a plurality of timestamps, a location of the agricultural implement;
- identifying a plurality of passes in the time-series data including:
  - computing a time difference between a first timestamp and a second timestamp;
  - computing a space difference between a location corresponding to the first timestamp and a location corresponding to the second timestamp;
  - computing a heading difference between a heading of the agricultural implement at the first timestamp and a heading of the agricultural implement at the second timestamp; and
  - determining that the time difference is greater than a first threshold value, the space difference is greater than a second threshold value, and the heading difference is greater than a third threshold value and, in response, determining that the second timestamp corresponds to a different pass as the first timestamp;
- using the identified plurality of passes, identifying a plurality of locations on the agricultural field in which the activity performed by the agricultural implement included a particular operational abnormality, the particular operational abnormality including an edge pass, a point row or an end row; and
- generating a map of operational abnormalities for the agricultural field, the map of operational abnormalities including the plurality of locations on the agricultural field in which the activity performed by the agricultural implement included the particular operational abnormality.

8. The method of claim 7, wherein the particular operational abnormality comprises the edge pass and wherein identifying the plurality of locations on the agricultural field in which the activity performed by the agricultural implement included the particular operational abnormality comprises:
- determining a width of the agricultural implement;
- determining a boundary of the agricultural field from the time-series data; and
- identifying each location within the determined width from the boundary of the agricultural field as an edge pass location.

9. The method of claim 7, wherein the particular operational abnormality comprises the end row and wherein identifying the plurality of locations on the agricultural field in which the activity performed by the agricultural implement included the particular operational abnormality comprises:
- identifying a first timestamp and a second timestamp in the time-series data that are associated with a particular location; and
- determining that a heading of the agricultural implement for the first timestamp is different from a heading of the agricultural implement for the second time stamp by a threshold value and, in response, identifying the particular location as an end row location.

10. The method of claim 7, further comprising:
- generating a prescription map corresponding to the map of operational abnormalities which identifies a second activity to perform in the plurality of locations;
- generating a script which, when executed by a second agricultural implement, causes the second agricultural implement to perform the second activity in the plurality of locations on the agricultural field; and
- sending the script to the second agricultural implement to cause the second agricultural implement to perform the second activity in the plurality of locations on the agricultural field.

11. The method of claim 7, further comprising:
- using the map of operational abnormalities, identifying one or more trial locations on the agricultural field;

generating a prescription map which identifies a second activity to perform in the trial locations;

generating a script which, when executed by a second agricultural implement, causes the second agricultural implement to perform the second activity in the plurality of locations on the agricultural field; and sending the script to the second agricultural implement to cause the second agricultural implement to perform the second activity in the plurality of locations on the agricultural field.

12. The method of claim 7, further comprising:

receiving yield data for the agricultural field;

using the map of operational abnormalities, generating updated yield data for the agricultural field; and generating a yield analysis for the agricultural field excluding the data identified using the map of operational abnormalities.

13. A system comprising:

one or more processors;

a memory storing instructions which, when executed by the one or more processors, causes performance of:

receiving time-series data captured from an agricultural implement performing an agronomic activity on an agricultural field, the time-series data including, for each of a plurality of timestamps, a location of the agricultural implement;

identifying a plurality of passes in the time-series data including:

using the time-series data, generating a heading difference time-series comprising changes in heading of the agricultural implement for a plurality of intervals of time;

identifying a peak heading change in the heading difference time-series; and identifying a first pass of the plurality of passes as including locations corresponding to time-series data prior to the peak and a second pass of the plurality of passes as including locations corresponding to time-series data after the peak;

using the identified plurality of passes, identifying a plurality of locations on the agricultural field in which the activity performed by the agricultural implement included a particular operational abnormality, the particular operational abnormality including an edge pass, a point row or an end row; and generating a map of operational abnormalities for the agricultural field, the map of operational abnormalities including the plurality of locations on the agricultural field in which the activity performed by the agricultural implement included the particular operational abnormality.

14. The system of claim 13, wherein the particular operational abnormality comprises the edge pass and wherein identifying the plurality of locations on the agricultural field in which the activity performed by the agricultural implement included the particular operational abnormality comprises:

determining a width of the agricultural implement;

determining a boundary of the agricultural field from the time-series data; and identifying each location within the determined width from the boundary of the agricultural field as an edge pass location.

15. The system of claim 13, wherein the particular operational abnormality comprises the end row and wherein identifying the plurality of locations on the agricultural field in which the activity performed by the agricultural implement included the particular operational abnormality comprises:

identifying a first timestamp and a second timestamp in the time-series data that are associated with a particular location; and determining that a heading of the agricultural implement for the first timestamp is different from a heading of the agricultural implement for the second time stamp by a threshold value and, in response, identifying the particular location as an end row location.

16. The system of claim 13, wherein the instructions, when executed by the one or more processors, further cause performance of:

generating a prescription map corresponding to the map of operational abnormalities which identifies a second activity to perform in the plurality of locations;

generating a script which, when executed by a second agricultural implement, causes the second agricultural implement to perform the second activity in the plurality of locations on the agricultural field; and sending the script to the second agricultural implement to cause the second agricultural implement to perform the second activity in the plurality of locations on the agricultural field.

17. The system of claim 13, wherein the instructions, when executed by the one or more processors, further cause performance of:

receiving yield data for the agricultural field;

using the map of operational abnormalities, generating updated yield data for the agricultural field; and generating a yield analysis for the agricultural field excluding the data identified using the map of operational abnormalities.

18. A method comprising:

receiving time-series data captured from an agricultural implement performing an agronomic activity on an agricultural field, the time-series data including, for each of a plurality of timestamps, a location of the agricultural implement;

identifying a plurality of passes in the time-series data including:

using the time-series data, generating a heading difference time-series comprising changes in heading of the agricultural implement for a plurality of intervals of time;

identifying a peak heading change in the heading difference time-series; and identifying a first pass of the plurality of passes as including locations corresponding to time-series data prior to the peak and a second pass of the plurality of passes as including locations corresponding to time-series data after the peak;

using the identified plurality of passes, identifying a plurality of locations on the agricultural field in which the activity performed by the agricultural implement included a particular operational abnormality, the particular operational abnormality including an edge pass, a point row or an end row; and generating a map of operational abnormalities for the agricultural field, the map of operational abnormalities including the plurality of locations on the agricultural field in which the activity performed by the agricultural implement included the particular operational abnormality.

19. The method of claim 18, wherein the particular operational abnormality comprises the edge pass and wherein identifying the plurality of locations on the agricultural field in which the activity performed by the agricultural implement included the particular operational abnormality comprises:

determining a width of the agricultural implement;

determining a boundary of the agricultural field from the time-series data; and identifying each location within the determined width from the boundary of the agricultural field as an edge pass location.

20. The method of claim 18, wherein the particular operational abnormality comprises the end row and wherein identifying the plurality of locations on the agricultural field in which the activity performed by the agricultural implement included the particular operational abnormality comprises:

identifying a first timestamp and a second timestamp in the time-series data that are associated with a particular location; and determining that a heading of the agricultural implement for the first timestamp is different from a heading of the agricultural implement for the second time stamp by a threshold value and, in response, identifying the particular location as an end row location.

21. The method of claim 18, further comprising:

generating a prescription map corresponding to the map of operational abnormalities which identifies a second activity to perform in the plurality of locations;

generating a script which, when executed by a second agricultural implement, causes the second agricultural implement to perform the second activity in the plurality of locations on the agricultural field; and sending the script to the second agricultural implement to cause the second agricultural implement to perform the second activity in the plurality of locations on the agricultural field.

22. The method of claim 18, further comprising:

receiving yield data for the agricultural field;

using the map of operational abnormalities, generating updated yield data for the agricultural field; and generating a yield analysis for the agricultural field excluding the data identified using the map of operational abnormalities.

* * * * *